United States Patent
Lincoln et al.

(10) Patent No.: US 7,665,368 B2
(45) Date of Patent: Feb. 23, 2010

(54) FLOW METER

(75) Inventors: David Lincoln, Stonehouse (GB); Michael Armitage, Stonehouse (GB)

(73) Assignee: ABB Limited, Cheshire (GB)

( * ) Notice: Subject to any disclaimer, the term of this patent is extended or adjusted under 35 U.S.C. 154(b) by 59 days.

(21) Appl. No.: 11/840,697

(22) Filed: Aug. 17, 2007

(65) Prior Publication Data

US 2008/0060447 A1 Mar. 13, 2008

(30) Foreign Application Priority Data

Aug. 18, 2006 (GB) ................................ 0616505.4

(51) Int. Cl.
*G01F 1/60* (2006.01)

(52) U.S. Cl. .................................. 73/861.12

(58) Field of Classification Search .............. 73/861.08, 73/861.011–861.16, 861.18, 861.79
See application file for complete search history.

(56) References Cited

U.S. PATENT DOCUMENTS

| | | | |
|---|---|---|---|
| 3,309,924 A | 3/1967 | Kolin et al. | |
| 3,449,951 A * | 6/1969 | Westersten | 73/861.17 |
| 3,835,705 A * | 9/1974 | Hadjidjanian | 73/861.09 |
| 4,015,471 A | 4/1977 | Marsh | |
| 4,019,385 A * | 4/1977 | Watanabe | 73/861.12 |
| 4,388,834 A | 6/1983 | Schmoock | |
| 4,420,983 A * | 12/1983 | Langdon | 73/861.18 |
| 4,430,901 A * | 2/1984 | Rogers | 73/861.33 |
| 4,434,666 A | 3/1984 | Hemp et al. | |
| 4,614,121 A | 9/1986 | Hansen et al. | |
| 4,741,215 A | 5/1988 | Bohn et al. | |
| 4,899,593 A * | 2/1990 | Inami et al. | 73/861.12 |
| 4,920,795 A | 5/1990 | Codazzi et al. | |
| 5,150,061 A | 9/1992 | Castel et al. | |
| 5,583,299 A * | 12/1996 | Murase | 73/861.12 |
| 5,646,353 A | 7/1997 | Mesch et al. | |
| 5,708,213 A | 1/1998 | Batey | |
| 5,773,723 A * | 6/1998 | Lewis et al. | 73/861.12 |
| 5,852,247 A | 12/1998 | Batey | |
| 5,880,376 A * | 3/1999 | Sai et al. | 73/861.08 |
| 6,237,424 B1 | 5/2001 | Salmasi et al. | |

(Continued)

FOREIGN PATENT DOCUMENTS

DE 19708857 7/1998

(Continued)

*Primary Examiner*—Jewel Thompson
(74) *Attorney, Agent, or Firm*—Alston & Bird, LLP

(57) ABSTRACT

An electromagnetic flow meter for measuring flow rate of a fluid passing therethrough includes a conduit defining a fluid inlet, a fluid outlet and a measuring section positioned between the inlet and the outlet. The flow meter also includes a single coil for generating a magnetic field across the measuring section and electrodes for detecting induced electrical potential due to the fluid passage. The flow meter also includes means for conditioning the flow through the measuring section. The combination of the single coil and the flow conditioning means provides a flow meter with a desired level of accuracy. The single coil and the electrodes may be arranged so that the integral of a weight function, which defines the sensitivity of the flow meter to fluid velocity through different parts of the measuring section, over the first half of a measuring section closest to the coil is between 0.4 and 1.3 times the integral of the weight function over the other half of the measuring section.

31 Claims, 8 Drawing Sheets

U.S. PATENT DOCUMENTS

| | | | |
|---|---|---|---|
| 6,595,069 | B2 | 7/2003 | Frey et al. |
| 6,817,249 | B2 | 11/2004 | Yamazaki |
| 7,117,749 | B2 | 10/2006 | Turner |
| 7,213,467 | B2 | 5/2007 | Turner et al. |
| 7,228,748 | B2 | 6/2007 | Keech et al. |
| 7,369,949 | B2 | 5/2008 | Yamamoto |
| 7,523,675 | B2 * | 4/2009 | Sulzer et al. ............. 73/861.12 |
| 2004/0250629 | A1 | 12/2004 | Turner et al. |
| 2007/0220993 | A1 | 9/2007 | Yamamoto |
| 2007/0272030 | A1 | 11/2007 | Yamamoto |
| 2008/0028867 | A1 | 2/2008 | Yamamoto |

FOREIGN PATENT DOCUMENTS

| | | |
|---|---|---|
| DE | 10046195 | 4/2002 |
| EP | 0 638 785 A2 | 2/1995 |
| GB | 2081449 | 2/1982 |
| GB | 2314902 | 1/1998 |
| GB | 2324606 | 10/1998 |
| GB | 2 328 021 A | 2/1999 |
| GB | 2358064 | 7/2001 |
| GB | 2371368 | 7/2002 |
| GB | 2376529 | 12/2002 |
| GB | 2377030 | 12/2002 |
| GB | 2385667 | 8/2003 |
| GB | 2 409 525 A | 6/2005 |
| GB | 2 411 236 A | 8/2005 |
| JP | 58085118 | 5/1983 |
| JP | 04295722 | 10/1992 |
| JP | 2002333354 | 11/2002 |
| WO | WO 01/50094 | 7/2001 |

* cited by examiner

FLOW METER

CROSS-REFERENCE TO RELATED APPLICATIONS

This application claims priority of Great Britain Application No. 0616505.4, filed Aug. 18, 2006, which is hereby incorporated herein in its entirety by reference.

FIELD OF THE INVENTION

The present invention relates to flow meters and in particular to electromagnetic flow meters and the manufacture thereof.

BACKGROUND OF THE INVENTION

Electromagnetic flow meters, and their modes of operation, are well known. In use, an electromagnetic field is generated whose lines of flux are mutually perpendicular to the longitudinal axis of the flow tube through which the fluid to be metered is conducted and to the transverse axis along which the electrodes are located at diametrically opposed positions with respect to the tube. The operating principles are based on Faraday's Law of induction, which states that the voltage induced across any conductor as it moves at right angles through a magnetic field will be proportional to the velocity of that conductor. The metered fluid effectively constitutes a series of fluid conductors moving through the magnetic field; the more rapid the rate of flow, the greater the instantaneous values of the voltage established at the electrodes.

Electromagnetic flow metering is a mature and robust technology with the first commercial units being sold over 50 years ago. However, the cost of electromagnetic flow meters is relatively high mainly due to the materials used in their construction and necessarily high labour costs.

Existing commercial electromagnetic flow meters employ two coils positioned on either side of the flow tube in order to try to generate a homogenous magnetic field across the flow tube. Typically bobbin coils wound on suitable pole pieces are used.

BRIEF SUMMARY OF THE INVENTION

The present invention aims to provide at least an alternative type of electromagnetic flow meter which can be made at lower cost than currently available flow meters.

The present invention provides an electromagnetic flow meter apparatus comprising: an elongate section of flow conduit through which fluid can flow along a flow path; an elongate moulded insert positioned within and extending longitudinally along said elongate section of flow conduit, the insert comprising: i) an inlet for receiving fluid flowing along said flow conduit, ii) an outlet in fluid communication with said inlet for outputting fluid that flows through said insert; and iii) a measuring section positioned between, and in fluid communication with, said inlet and outlet; wherein said inlet comprises a restriction for conditioning the fluid flow through said measuring section and wherein said measuring section comprises a single coil for generating a magnetic field across said measuring section.

The restriction can be formed by a transition section between the inlet and the measuring section, wherein the cross-sectional shape of the insert in a direction transverse to said flow path transforms smoothly from the shape of the inlet to the shape of the measuring section in the transition section.

In one embodiment, the measuring section has a cross-section in a direction transverse to said flow path having at least two substantially parallel sides over at least part of its length.

Typically the flow conduit comprises an outlet that extends away from the flow path for providing power to the coil and for allowing readings to be obtained from the equipment within the flow conduit.

In a preferred embodiment the single coil is saddle shaped and extends along the length of the measuring section and is curved around an outer wall of the measuring section over an effective angle of between 140 and 180 degrees, as this type of coil facilitates the design of the meter to achieve the above constraints. The turns of the saddle shaped coil may enclose a substantially rectangular or diamond shaped area. Alternatively, a bobbin coil wound on a pole piece may be used. Pole pieces may also be used with the saddle shaped coil to generate the desired magnetic field pattern.

The flow meter may include a section of conduit and an elongate insert adapted for longitudinal insertion along and within the section of conduit, with the insert comprising the inlet, outlet and measuring section.

The flow meter can be a wetted type or a capacitive type flow meter.

In one embodiment, the cross-sectional area of the measuring section in a direction transverse to the flow path divided by the cross-sectional area of the flow conduit in a direction transverse to the flow path is less than 70%. In one embodiment, the cross-sectional area of the measuring section may cover less than around 50% of the cross-sectional area of the flow conduit. This may be useful in a low flow rate system or to increase the uniformity of the magnetic field in the measuring section.

If desired an electrostatic screen may be provided integrally with or coupled to the insert for providing screening and structural stability to the insert.

Preferably, the insert is manufactured by moulding or extrusion, for example by injection moulding, transfer moulding or rotational moulding. Moulding the flow meter insert, from a material such as a plastics or rubber material may allow non-circular flow meter inserts to be provided that are lightweight and economical but that are strong and robust enough to maintain their integrity under fluid pressure. In one embodiment, the insert may be manufactured substantially from a thermoplastic material; for example, the insert may be manufactured from a glass-loaded plastics material. In another embodiment, the insert may be manufactured substantially from a thermoset material.

The insert may be bonded to backpotting, which may be provided to give the insert the strength and rigidity required under fluid pressure. The method of manufacture of the insert is preferably selected based on the material used for the insert and the most suitable method for the particular material selected, which may be a prior art method, may be used.

The invention also provides a method of manufacturing a flow meter comprising: providing an elongate flow conduit through which fluid can flow along a flow path; providing an elongate insert comprising: i) an inlet for receiving fluid flowing along said flow conduit; ii) an outlet in fluid communication with said inlet for outputting fluid that flows through said insert; and iii) a measuring section positioned between, and in fluid communication with, said inlet and outlet; wherein said inlet comprises a restriction for conditioning the fluid flow through said measuring section and wherein said measuring section comprises a single coil for generating a magnetic field across said measuring section; and inserting the elongate insert, including the single coil, longitudinally within said elongate flow conduit.

According to another aspect, the present invention provides an electromagnetic flow meter comprising: i) an inlet for receiving fluid flowing along a flow conduit, ii) an outlet in fluid communication with said inlet for outputting fluid that flows through the flow meter; iii) a measuring section positioned between, and in fluid communication with, said inlet and outlet; iv) a single coil positioned adjacent one side of said measuring section for generating a magnetic field across said measuring section; and v) electrodes for sensing electric fields generated by fluid flow through said magnetic field in said measuring section; wherein said single coil and said electrodes are arranged so that the integral of a weight function, which defines the sensitivity of the flow meter to fluid velocity through different parts of the measuring section, over a first half of said measuring section closest to said coil, is between 0.4 and 1.3 times the integral of the weight function over the other half of the measuring section. The inventors have found that designing the geometries of the electrodes and the coil to meet the above relationship results in a flow meter that can provide accurate flow measurements for many applications.

In a preferred embodiment the inlet includes a restriction for conditioning the fluid flow through the measuring section. In this case the cross-sectional area of the measuring section in a direction transverse to the flow path divided by the cross-sectional area of the flow conduit in a direction transverse to the flow path is preferably less than 70%.

The present invention also provides a method of manufacturing a flow meter comprising: i) providing an inlet for receiving fluid flowing along a flow conduit, ii) providing an outlet in fluid communication with said inlet for outputting fluid that flows through the flow meter; iii) providing a measuring section positioned between, and in fluid communication with, said inlet and outlet; iv) providing a single coil and positioning the single coil adjacent one side of said measuring section for generating a magnetic field across said measuring section; v) providing electrodes for sensing electric fields generated by fluid flow through said magnetic field in said measuring section; arranging said single coil and said electrodes so that the integral of a weight function, which defines the sensitivity of the flow meter to fluid velocity through different parts of the measuring section, over a first half of said measuring section closest to said coil, is between 0.4 and 1.3 times the integral of the weight function over a second half of the measuring section furthest from said coil.

Preferably, the insert is back-potted on insertion into the flow conduit. Back-potting may allow the insert to be supported and stabilized within the conduit and hence may increase the reliability of the flow measurements.

A skilled person will appreciate that variations of detail may be provided and features of one aspect may be applied to other aspects within the scope of the invention as set out in the attached claims.

BRIEF DESCRIPTION OF THE SEVERAL VIEWS OF THE DRAWINGS

In order to aid in the understanding of the present invention, a number of exemplary embodiments will now be described in detail, with reference to the accompanying Figures in which.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Embodiment 1

Figure 1A:
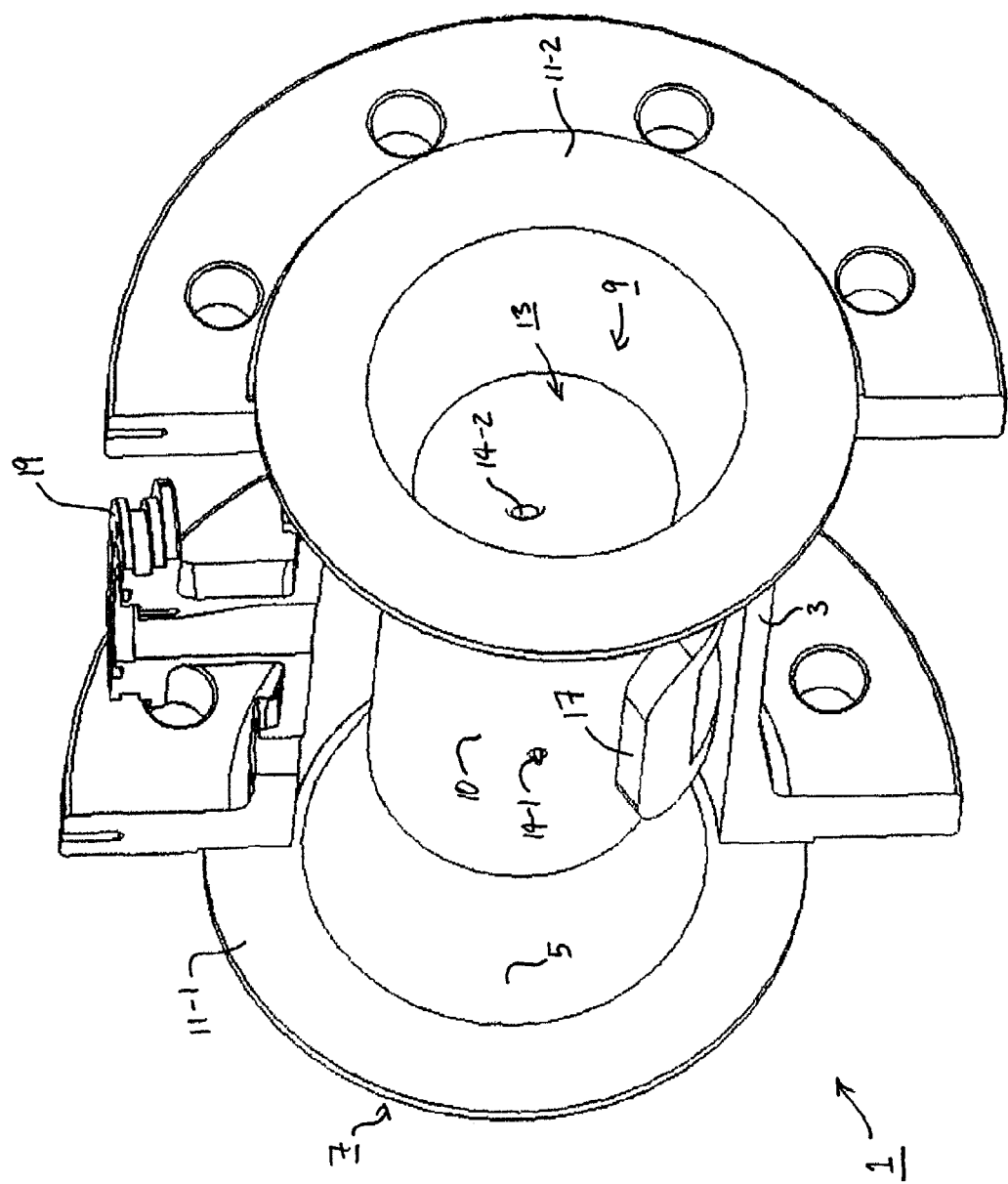
FIG. 1A is a part cut away perspective view of an electromagnetic flow meter embodying the present invention.
Figure 1C:
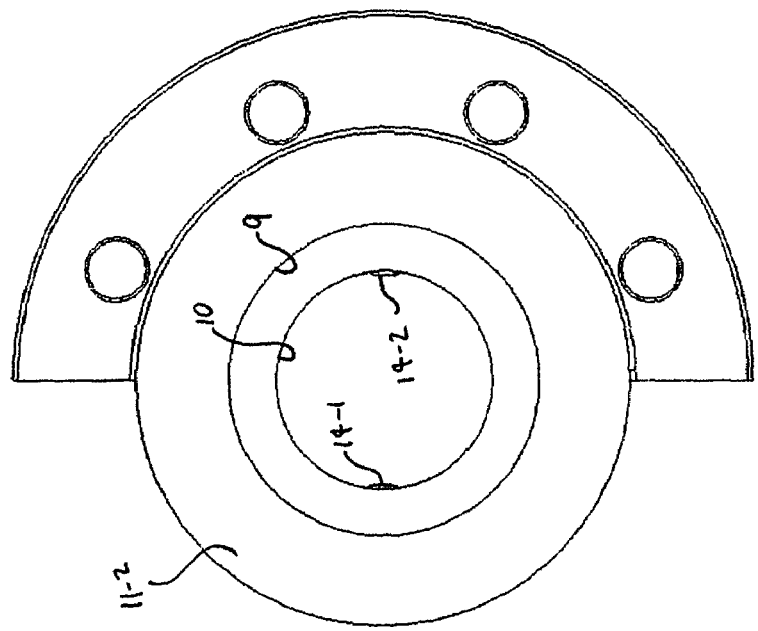
FIG. 1C is a end view of the electromagnetic flow meter shown in FIG. 1A.
Figure 1B:
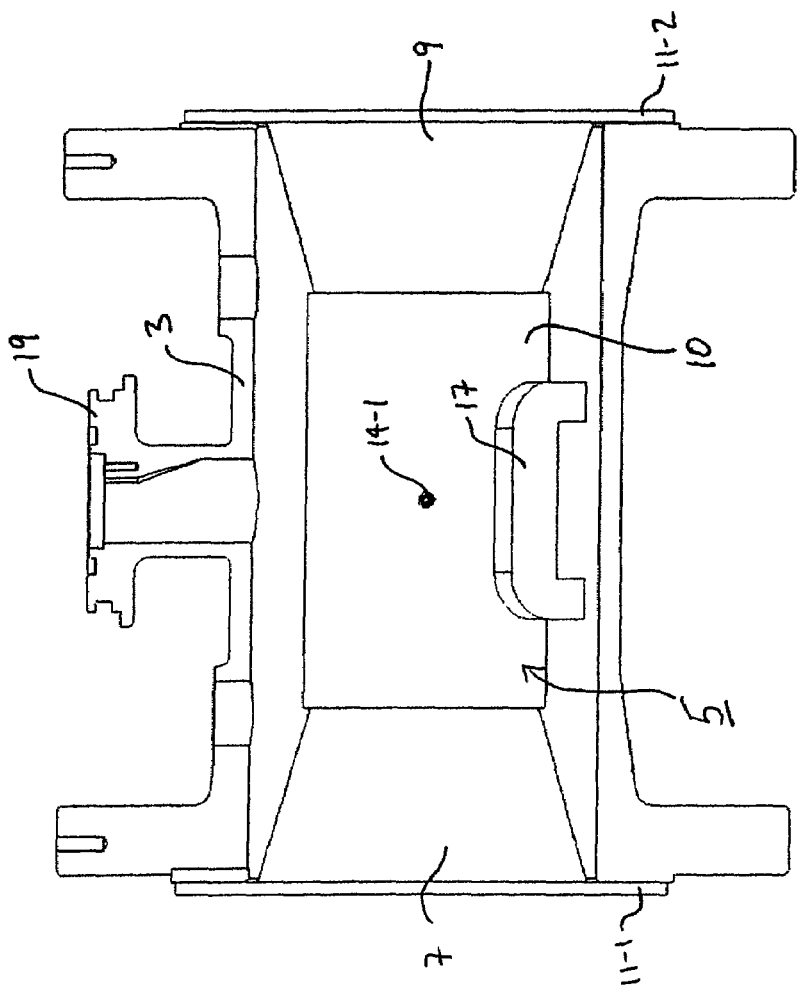
FIG. 1B is a side view of the part cut away electromagnetic flow meter shown in FIG. 1A.
Figure 2B:
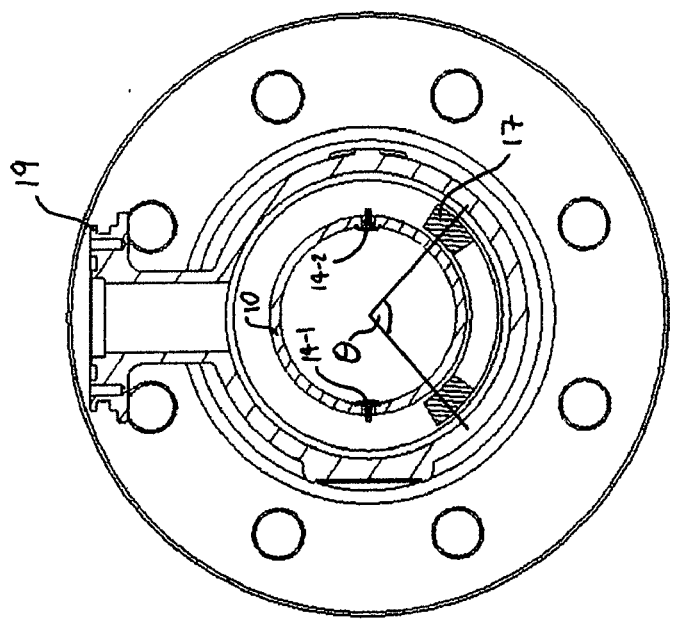
FIGS. 2A and 2B are side and sectional views of the electromagnetic flow meter of FIG. 1A.
Figure 2A:
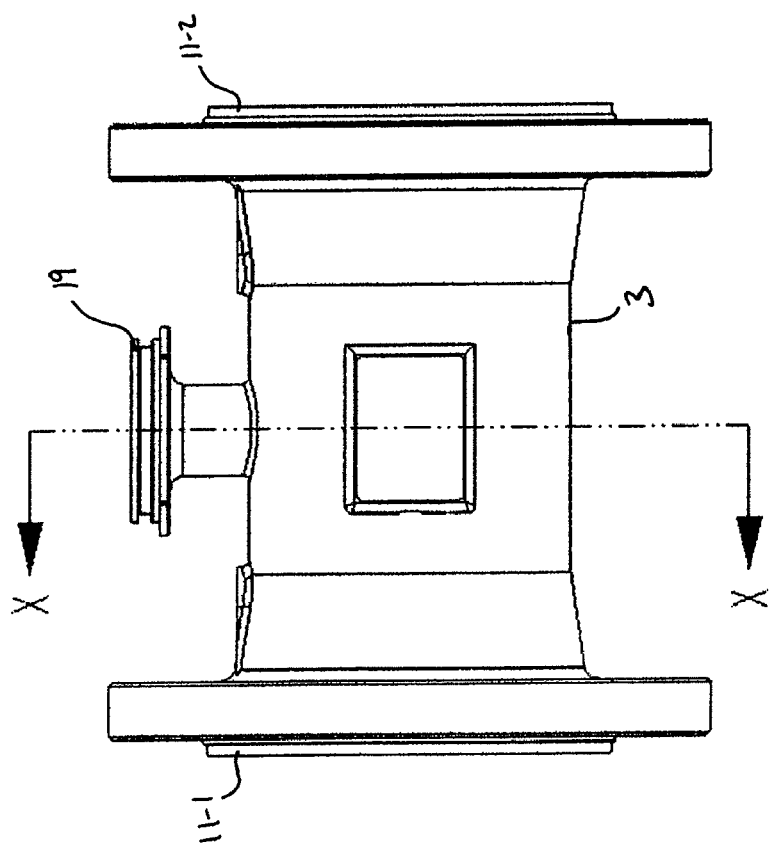

FIGS. 1 and 2 illustrate an electromagnetic flow meter 1 embodying the present invention. The flow meter 1 has a flow conduit 3 (made in this embodiment of Carbon Steel) which is cut in half to illustrate the form of an elongate insert 5 that is longitudinally inserted within the conduit 3. The insert 5 includes an inlet section 7, an outlet section 9 and a central measuring section 10, all of substantially circular cross-section. The dimensions of the inlet 7 and the outlet 9 are such that these sections of the insert 5 just fit within the flow conduit 3. In this embodiment, the insert has flanges 11-1 and 11-2 at each end (one of which may be detachable to facilitate insertion of the insert 5 within the flow conduit 3) that hold the insert securely within the flow conduit 3. The inner walls of the insert 3 define a central bore 13 for the passing of the fluid and means in the form of electrodes 14-1 and 14-2, for detecting electrical potential of the fluid passing through the central bore 13, using known methods, are located in the side wall of the measuring section 10. Small area electrodes 14 are preferably used having a diameter of between 0.1 mm and 20 mm. More or larger electrodes 14 may be used depending on the application of the electromagnetic flow meter, or the diameter of its bore 13. For example, if the central bore 13 is relatively large (e.g. greater than 600 mm) or if the fluid has relatively low conductively, then additional or larger electrodes may be employed.

In this embodiment, a single saddle shaped coil 17 is provided surrounding a lower portion of the measuring section 10. As illustrated more clearly in the cross-sectional view of FIG. 2B, in this embodiment the coil 17 curves around the outer wall of the measuring section 10 over a segment angle (θ) of 120 degrees, which is measured from the central axis of the measuring section 10 to the centres of the coil bundles of the coil 17. The coil 17 also extends along the length of the measuring section 10 over a distance of between 0.1 and 10 times the width of the measuring section in a direction transverse to the flow path. The inventors have found surprisingly, and contrary to industry standard practice, that the use of a single coil 17 to generate the magnetic field across the measuring section 10 can provide sufficiently accurate flow measurement results. The inventors found in particular that good accuracy was obtained when the single coil 17 are designed so that the integral of a weight function (to be described in more detail below) over the lower half of the measuring section (which is at least partially surrounded by the saddle coil 17) is between 0.4 and 1.3 times the integral of the weight function over the other half of the measuring section (furthest from the coil).

In this embodiment, the flow conduit 3 also has an outlet 19 which may be used to provide power to the single coil 17 and may be used to allow readings to be obtained from the equipment within the conduit 3.

On insertion into the flow conduit 3, the insert 5 is preferably back-potted to support the insert 5 and stabilize it within the flow conduit 3. Any suitable potting compound may be used, for example epoxy resin or polyurethane.

The flow meter insert 5 may be manufactured by injection moulding. The insert 5 may be manufactured from a plastics material, such as ABS, from natural or synthetic rubber, or from another similar material.

An insert manufactured from materials that are less affected by elevated temperatures or corrosive fluids (such as PTFE, PFA, i.e. 'Teflon' family) may be manufactured from methods already used by these industries (including machining, sintering, Transfer moulding, rotational moulding etc). The methods of manufacture for these materials are slightly different to 'normal' plastics due to the viscoelastic properties of these materials at their processing temperatures. Other more conventional plastics that could be used for less demanding specialist applications such as HDPE or PVDF could be manufactured from more conventional techniques such as injection moulding.

Weight Function

Manufacturers design electromagnetic flow meters so that they measure the average velocity of the fluid flowing within the conduit at all Reynolds numbers. The shape of the electrode and coil geometry dictates how well the flow meter can measure the average velocity. Commercial flow meters typically use point contact electrodes, as they are simple to manufacture. However, with such electrodes it is virtually impossible to ensure that the flow meter will correctly measure the average velocity in all circumstances. Therefore, tools have been developed to help predict the performance of different electrode and coil geometries. In the book entitled "The Theory of Electromagnetic Flow-Measurement", Cambridge University Press, 1962, Shercliff analyses the behaviour of a number of different flow meter configurations and introduces the idea of a weight function vector and produced two dimensional graphs showing contours of weight function.

The contours of weight function represent how sensitive the flow meter will be to velocity at all positions within the measuring section. The induced voltage between the two electrodes can be defined by:

$$U = \oint W \cdot v \, d\tau \quad (1)$$

where the weight function vector W is given by:

$$W = B \times \nabla G \quad (2)$$

where $\nabla G$ represents the current distribution that is generated when unit current is injected into one electrode and out of the other. Rewriting equation 2 in Cartesian coordinates, where x and y are orthogonal axes across the flow meter conduit 3 and z is the direction of fluid flow along the flow conduit 3, the weight function vector at a point within the measuring section 10 is given by:

$$W = i(B_y G'_z - B_z G'_y) - j(B_x G'_z - B_z G'_x) + k(B_x G'_y - B_y G'_x) \quad (3)$$

with the assumption that the magnetic field and the virtual current field do not vary in the z direction, equation 3 simplifies to:

$$W = k(B_x G'_y - B_y G'_x) \quad (4)$$

A finite element analysis model is then used to model the magnetic and electric fields within the measuring section 10. The applicant uses a modelling program called "ANSYS Multi-physics version 9.0" to perform this finite element analysis. However, other modelling software may be used. A uniform mesh of finite elements may be used in the analysis. However, the size of the elements of the mesh preferably vary so that more elements are provided in areas where the weight function is likely to vary significantly and so that fewer elements are provided in areas where the weight function is likely to be more constant. The way in which such a finite element analysis can be carried out to determine values of $B_x$, $B_y$, $G_x$ and $G_y$ to determine the weight function at each of the mesh points will be well known to those skilled in the art and a further description will not be given.

Figure 3:
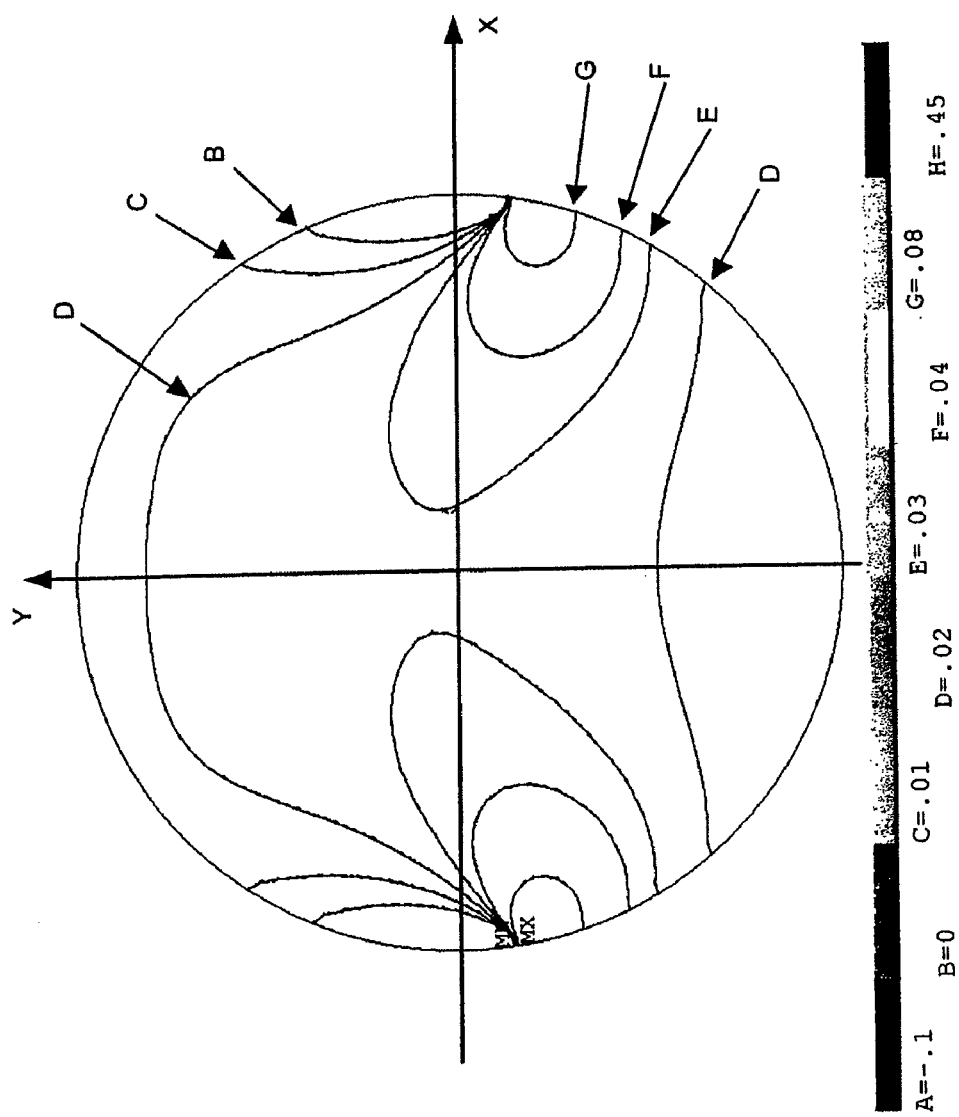
FIG. 3 illustrates weight function contours calculated for the electromagnetic flow meter shown in FIG. 1A.

Once a weight function vector has been calculated for each element within the model, the results can be viewed graphically as weight function contours, as illustrated in FIG. 3, which shows the weight function determined in the above manner for the coil and electrode design used in the electromagnetic flow meter shown in FIGS. 1 and 2. The inventors have found that a flow meter which provides the desired accuracy can be obtained by varying the size, shape and position of the coil 17 and the electrodes 14 so that the integral of the weight function vectors over the half of the measuring section closest to the coil 17 is between 0.4 and 1.3 times the integral of the weight function vectors over the other half of the measuring section 10 furthest away from the coil 17.

As those skilled in the art will appreciate, various different designs of coils 17, electrodes 14, measuring sections 10 and flow conduits 3 can be used and whose geometries can be designed to meet the above condition for the weight function.

Second Embodiment

Figure 4A:
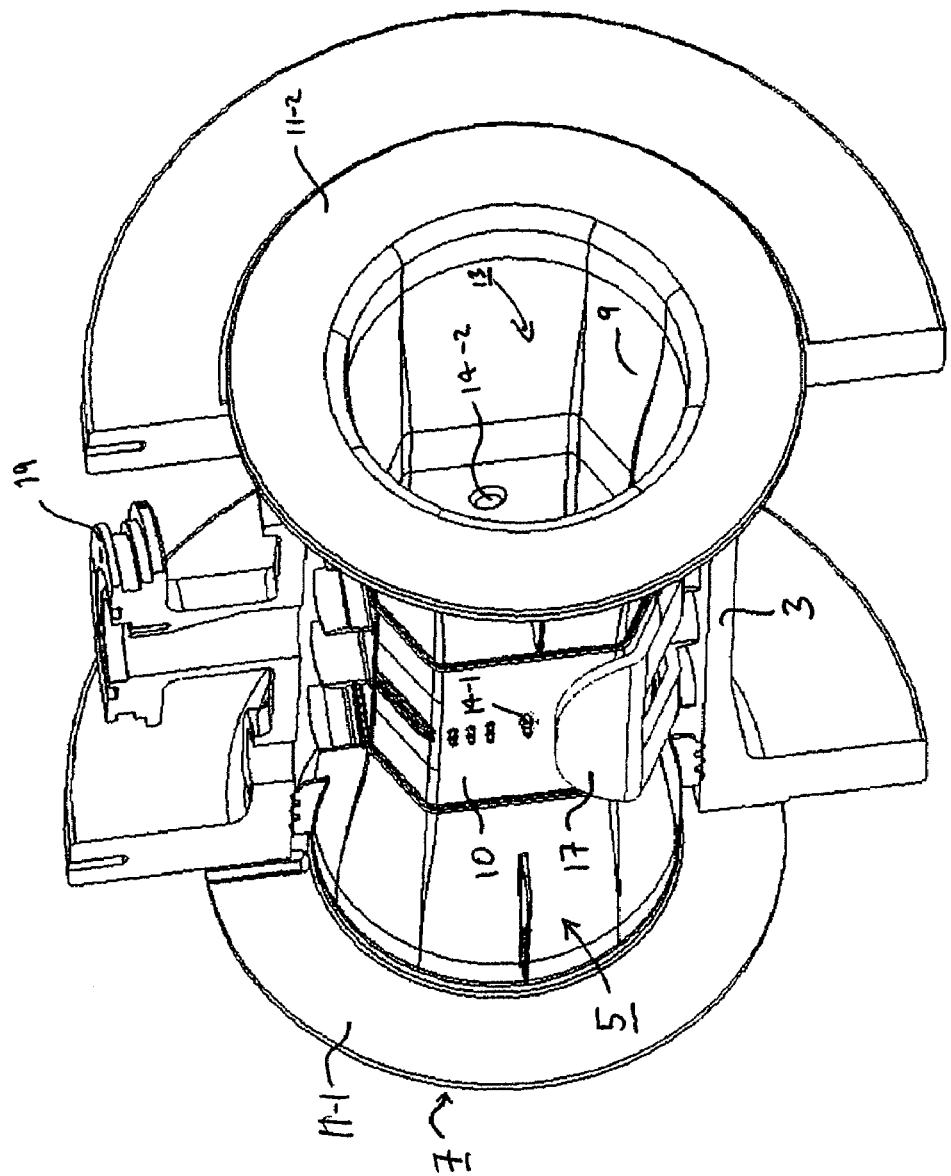
FIG. 4A is a part cut away perspective view of another electromagnetic flow meter embodying the present invention.
Figure 4C:
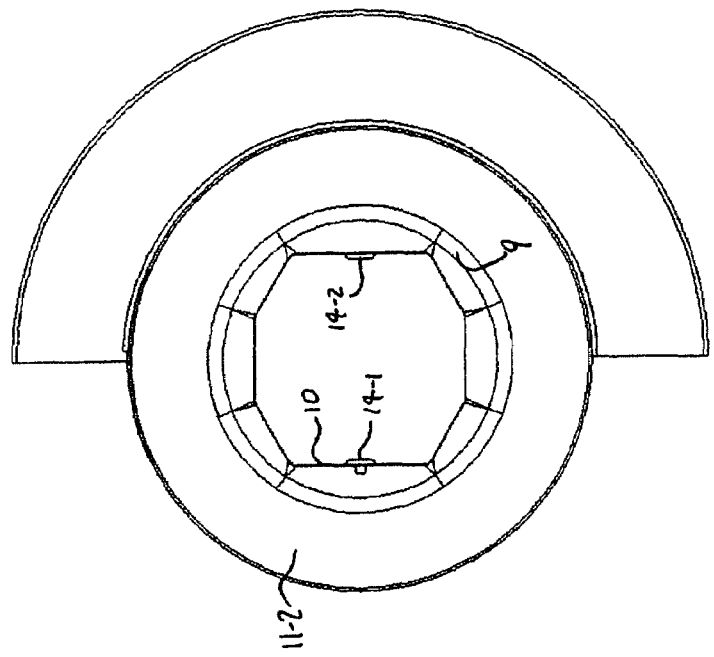
FIG. 4C is an end view of the part cut away electromagnetic flow meter shown in FIG. 4A.
Figure 4B:
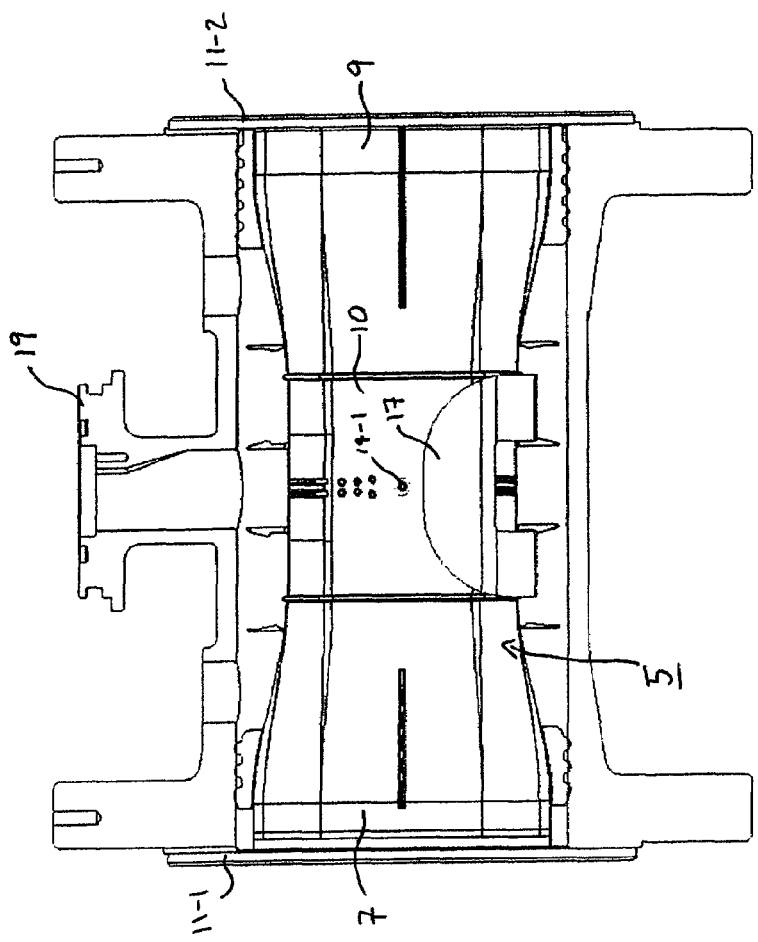
FIG. 4B is a side view of the part cut away electromagnetic flow meter shown in FIG. 4A.

FIGS. 4 and 5 illustrate an alternative design of electromagnetic flow meter embodying the present invention. In these Figures, the same reference numerals have been used to designate like elements.

Figures 5A, 5B:
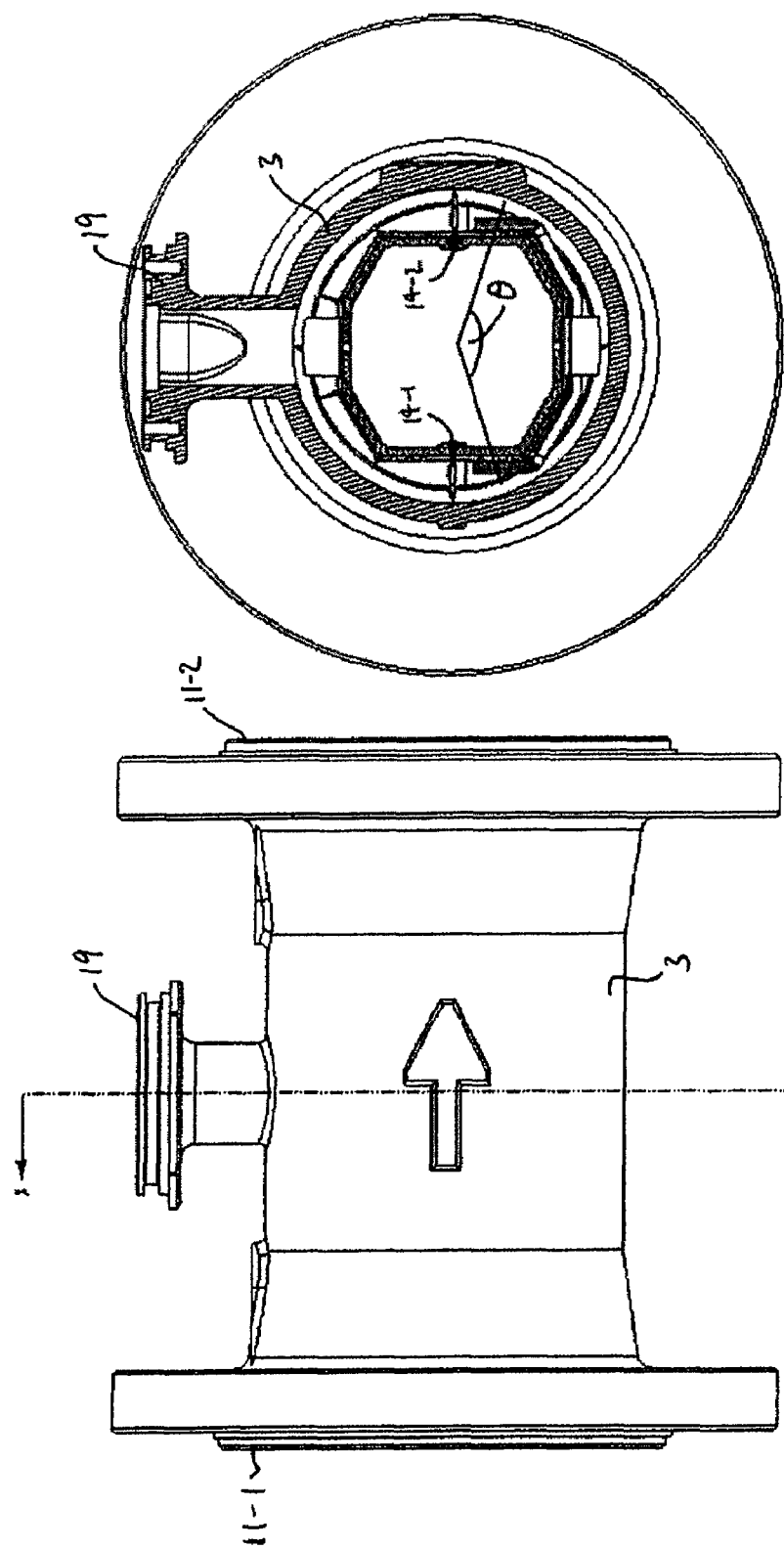
FIGS. 5A and 5B are side and cross-sectional views of the electromagnetic flow meter of FIG. 4A.

The main difference between the flow meter of this embodiment and the flow meter of the first embodiment is that the measuring section 10 has an octagonal cross-section in a direction transverse to the fluid flow. Further, in this embodiment, as illustrated in FIG. 5B, the single coil 17 surrounds a lower segment of the measuring section 10 having a segment angle ($\theta$) of approximately 140 degrees.

In this embodiment, the insert may be made from any one of: polytetrafluoroethylene (PTFE), ethylene-tetrafluoroethylene (ETFE), polypropylene (PP), polyvinylchloride (PVC), polyethylene terephthalate (PET), acrylonitrile butadiene styrene (ABS), polyethylene (PE), polybutylene terephtalate (PBT), polyoxymethylene (POM), polyphenylene sulphide (PPS) polyetherethere ketone (PEEK), high density polyethylene (HDPE) or polyvinilidene difluoride (PVDF).

Coil Shape and Manufacture

Figure 6B:
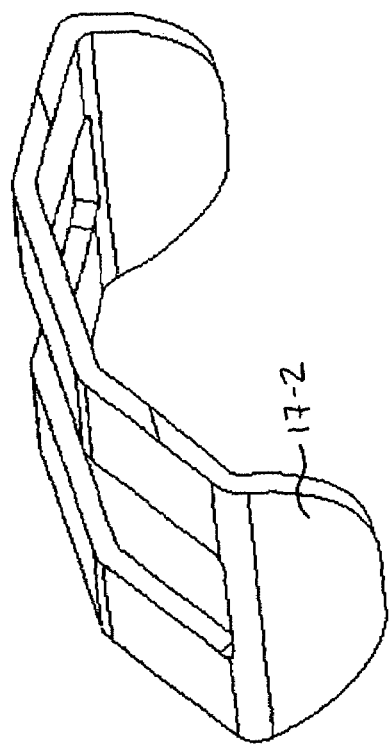
FIG. 6B illustrates in more detail the outline shape of the saddle coil used in the electromagnetic flow meter of FIG. 4.
Figure 6C:
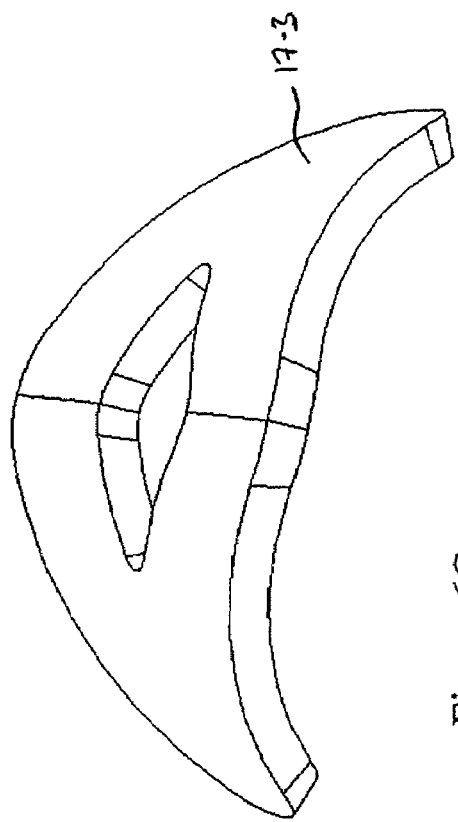
FIG. 6C illustrates in more detail the outline of a diamond shaped coil that can be used in alternative embodiments.
Figure 6A:
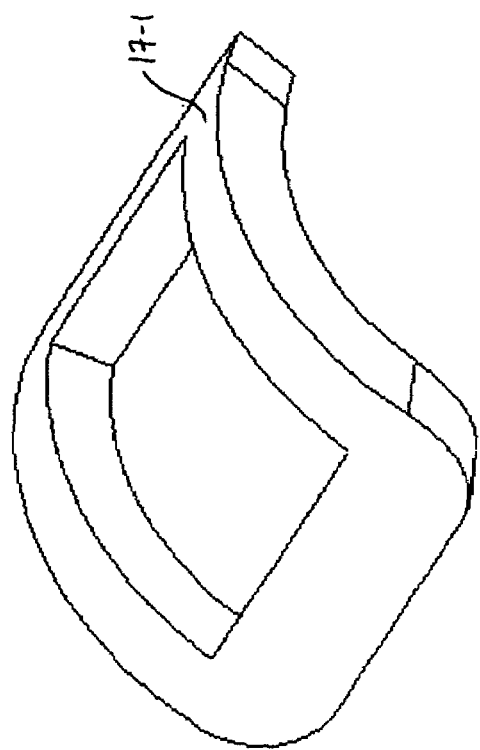
FIG. 6A illustrates in more detail the outline shape of the saddle coil used in the electromagnetic flow meter of FIG. 1.

FIG. 6 schematically illustrates the outline shape of a number of saddle coils 17 that can be used in electromagnetic flow meters embodying the present invention. In particular, FIG. 6A illustrates the outline shape of the saddle coil 17-1 used in the first embodiment described with reference to FIGS. 1 and 2; FIG. 6B illustrates the outline shape of the saddle coil 17-2 used in the second embodiment described with reference to FIGS. 4 and 5; and FIG. 6C illustrates the outline shape of an alternative "diamond shaped" saddle coil 17-3 that may be used in an alternative electromagnetic flow meter design.

As those skilled in the art will appreciate, the coils illustrated in FIG. 6 are not solid conductors, but are formed from a number of conductor turns (typically 100 or 200 turns) The number of turns, the area enclosed by the turns etc will depend on the diameter (width in a direction transverse to the fluid flow) of the measuring section 10 and hence of the flow conduit 3. Typically, the coil 17 is made by winding the coil to form a flat rectangular coil that is then deformed into a shape that conforms to the shape of the measuring section. The coil may be formed using heat-bonded wire so that it is fixed in the desired shape. Alternatively, the coil may be formed by winding the coil directly over the desired portion of the measuring section and then held in position using clamps or placed within an appropriate forming channel.

A pole piece may also be provided to help produce the required magnetic field pattern. For example, if a coil is required to cover a segment of the measuring section having a segment angle of 140 degrees, then either such a coil can be provided or a coil that covers a smaller segment angle (e.g. 120 degrees) can be used together with an appropriately shaped pole piece that curves around the measuring section. The two designs will produce the same or at least very similar magnetic field patterns and are therefore equivalent. In order to cover both of these possibilities, the appended claims refer to the "effective angle" of the coil.

Each feature disclosed in this specification (which term includes the claims) and/or shown in the drawings may be incorporated in the invention independently of other disclosed and/or illustrated features.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An electromagnetic flow meter apparatus comprising:
   an elongate section of flow conduit through which fluid can flow along a flow path;
      an elongate insert positioned within and extending longitudinally along said elongate section of flow conduit, the insert comprising:
      i) an inlet for receiving fluid flowing along said flow conduit,
      ii) an outlet in fluid communication with said inlet for outputting fluid that flows through said insert; and
      iii) a measuring section positioned between, and in fluid communication with, said inlet and outlet;
      wherein said inlet comprises a restriction for conditioning the fluid flow through said measuring section and wherein said measuring section comprises a single coil for generating a magnetic field across said measuring section.

2. An apparatus according to claim 1 wherein said restriction is formed by a transition section between the inlet and measuring section, wherein the cross-sectional shape of the insert in a direction transverse to said flow path transforms smoothly from the shape of the inlet to the shape of the measuring section in the transition section.

3. An apparatus according to claim 1 wherein the cross-sectional area of the measuring section in a direction transverse to said flow path divided by the cross-sectional area of the flow conduit in a direction transverse to said flow path is less than 0.7.

4. An apparatus according to claim 1 wherein the insert is manufactured substantially from a thermoplastic material.

5. An apparatus according to claim 1 wherein the insert is manufactured substantially from a thermoset material.

6. An apparatus according to claim 1 wherein the insert has a substantially square or rectangular cross-section in a direction transverse to said flow path over at least part of its length.

7. An apparatus according to claim 1 wherein the cross-sectional size and/or shape of the insert are arranged so that a substantially uniform magnetic field may be applied over substantially the whole cross-sectional area of the measuring section of the insert.

8. An apparatus according to claim 1 further comprising electrodes provided integrally with the inset or coupled to the insert.

9. An apparatus according to claim 1 wherein, as a result of said restriction, a space is provided between the measuring section and said flow conduit and wherein the space is back-potted on insertion of the insert into said flow conduit.

10. An apparatus according to claim 1 wherein the insert comprises a detachable flange for retaining the insert in the flow conduit.

11. An apparatus according to claim 1 wherein the flow conduit comprises an outlet that extends away from the flow path for providing power to the coil and for allowing readings to be obtained from the equipment within the flow conduit.

12. An apparatus according to claim 1, wherein said single coil is a saddle shaped coil that extends along the length of the measuring section and that is curved around an outer wall of the measuring section over a predetermined angle.

13. An apparatus according to claim 12, wherein said saddle shaped coil is curved around an outer wall of the measuring section over an effective angle of between 120 and 180 degrees.

14. An apparatus according to claim 13, wherein said single coil is positioned to surround a segment of said measuring section having a segment angle outside said range of angles and further comprising a pole piece that causes said coil to have similar magnetic characteristics to a coil that is positioned to surround a segment of said measuring section that has a segment angle within said range of angles.

15. An apparatus according to claim 12, wherein said single coil is a diamond shaped coil.

16. An apparatus according to claim 1, wherein said single coil is a bobbin coil wound on a pole piece.

17. An apparatus according to claim 1, wherein electrodes are positioned at opposite sides across the flow conduit.

18. An apparatus according to claim 17, wherein the electrodes are arranged, in use, to contact the fluid flowing through said measuring section.

19. An apparatus according to claim 17, wherein the electrodes are arranged, in use, to capacitively sense the electric field generated across said measuring section by said fluid flow.

20. An electromagnetic flow meter apparatus comprising:
i) an inlet for receiving fluid flowing along a flow conduit;
ii) an outlet in fluid communication with said inlet for outputting fluid that flows through the flow meter;
iii) a measuring section positioned between, and in fluid communication with, said inlet and outlet;
iv) a single coil positioned adjacent a portion of said measuring section for generating a magnetic field across said measuring section;
v) electrodes for sensing electric fields generated by fluid flow through said magnetic field in said measuring section;
wherein said single coil and said electrodes are arranged so that the integral of a weight function, which defines the sensitivity of the flow meter to fluid velocity through different parts of the measuring section, over a first half of said measuring section closest to said coil, is between 0.4 and 1.3 times the integral of the weight function over a second half of the measuring section furthest from said coil.

21. A flow meter according to claim 20, wherein said single coil is a saddle shaped coil that extends along the length of the measuring section and that is curved around an outer wall of the measuring section over a predetermined angle.

22. A flow meter according to claim 21, wherein said single coil is a saddle shaped coil that extends along the length of the measuring section and that is curved around an outer wall of the measuring section over an effective angle of between 120 and 180 degrees.

23. A flow meter according to claim 22, wherein said single coil is positioned to surround a segment of said measuring section having a segment angle outside said range of angles and further comprising a pole piece that causes said coil to have similar magnetic characteristics to a coil that is positioned to surround a segment of said measuring section that has a segment angle within said range of angles.

24. A flow meter according to claim 21, wherein said single coil is a diamond shaped coil.

25. A flow meter according to claim 20, wherein said single coil is a bobbin coil wound on a pole piece.

26. A flow meter according to claim 20, comprising a section of conduit and an elongate insert adapted for longitudinal insertion along and within said section of flow conduit, said insert comprising said inlet, outlet and said measuring section.

27. A flow meter according to claim 20, wherein said inlet comprises a restriction for conditioning the fluid flow through said measuring section.

28. A flow meter according to claim 20, wherein the cross-sectional area of the measuring section in a direction transverse to said flow path divided by the cross-sectional area of the flow conduit in a direction transverse to said flow path is less than 70%.

29. A flow meter according to claim 20, wherein said electrodes are positioned at opposite sides across the flow conduit.

30. A flow meter according to claim 20, wherein the electrodes are arranged, in use, to contact the fluid flowing through said measuring section.

31. A flow meter according to claim 20, wherein the electrodes are arranged, in use, to capacitively sense the electric field generated across said measuring section by said fluid flow.

* * * * *